(12) United States Patent
Langhammer

(10) Patent No.: US 9,164,728 B1
(45) Date of Patent: Oct. 20, 2015

(54) TERNARY DSP BLOCK

(75) Inventor: Martin Langhammer, High Wycombe (GB)

(73) Assignee: Altera Corporation, San Jose, CA (US)

( * ) Notice: Subject to any disclaimer, the term of this patent is extended or adjusted under 35 U.S.C. 154(b) by 585 days.

(21) Appl. No.: 13/471,951

(22) Filed: May 15, 2012

(51) Int. Cl.
*G06F 7/53* (2006.01)

(52) U.S. Cl.
CPC .................... *G06F 7/5324* (2013.01)

(58) Field of Classification Search
CPC ...................................... G06F 7/5324
USPC ......................................... 708/625
See application file for complete search history.

(56) References Cited

U.S. PATENT DOCUMENTS

| | | | |
|---|---|---|---|
| 7,523,434 B1 * | 4/2009 | Taylor et al. ................... | 716/100 |
| 2010/0228806 A1 * | 9/2010 | Streicher et al. .............. | 708/203 |

OTHER PUBLICATIONS

Dinechin et al. "Large multipliers with less DSP", 10 pages, 2009.*

* cited by examiner

*Primary Examiner* — Chuong D Ngo
(74) *Attorney, Agent, or Firm* — Ropes & Gray LLP

(57) ABSTRACT

Backwards compatible architecture for improving the arithmetic capability of existing processing blocks for relatively low cost is disclosed. The architecture includes a processing block on an integrated circuit device. The processing block includes a first, a second, and a third configurable multiplier and a configurable adder network. The processing block also includes a configurable interconnect within the processing block for routing signals between each of the multipliers and the adder network in accordance with a mode of operation. One or more of the processing blocks may be used to perform compute various calculations such as complex number multiplication and/or real number multiplication. The calculations may be performed on input values contain various numbers of bits, such as 36 bit numbers, 54 bit numbers, or 72 bit numbers.

18 Claims, 7 Drawing Sheets

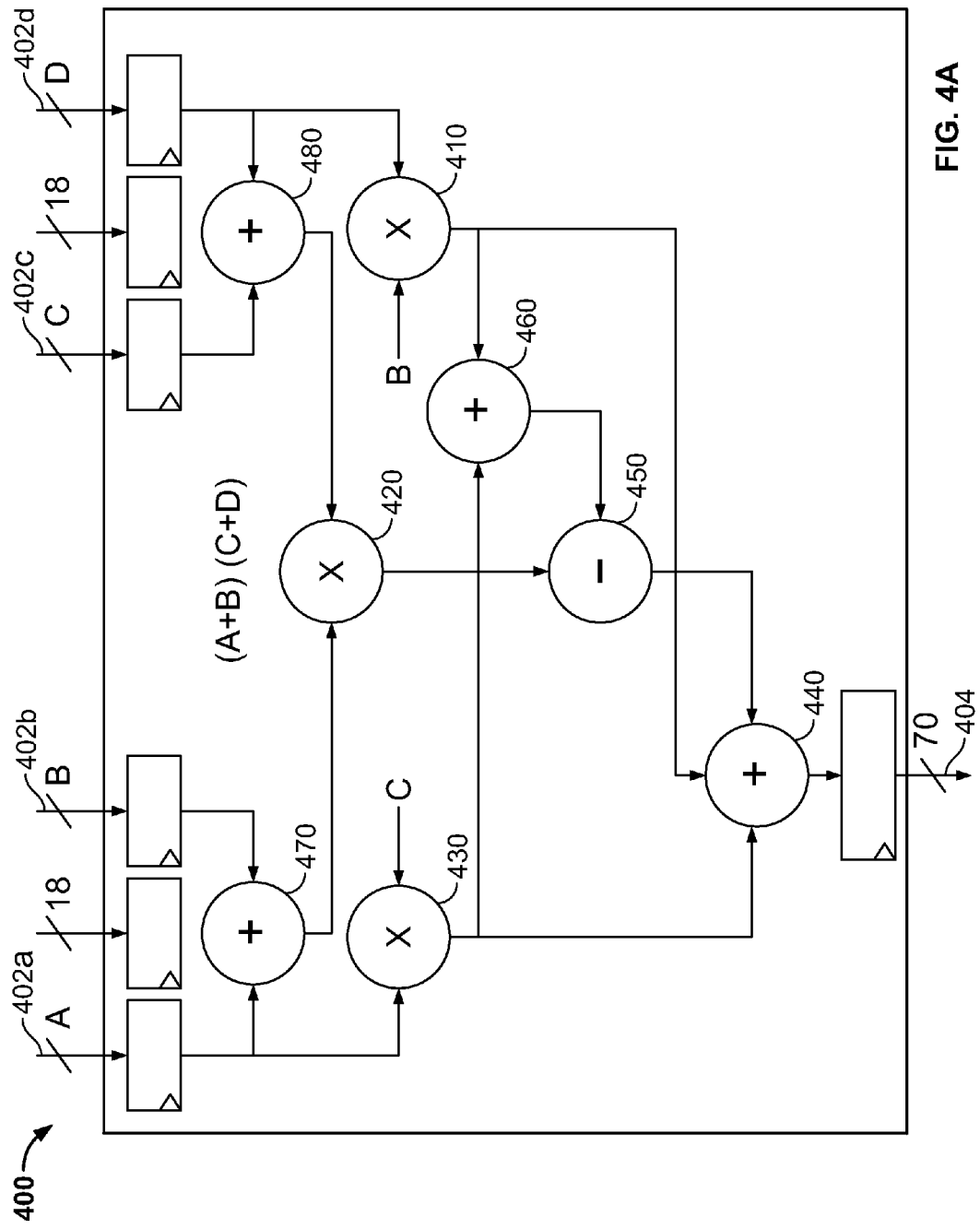

TERNARY DSP BLOCK

FIELD

The present disclosure relates to processing blocks for performing functions such as digital signal processing. In particular, the present disclosure relates to backwards compatible architecture for improving the arithmetic capability of existing processing blocks for relatively low cost.

BACKGROUND

A processing block, such as a digital signal processing (DSP) block, is a block of circuitry, that may be separate from the general-purpose programmable logic of a device on which it is implemented. The processing block may be at least partially hard-wired to perform a specific function such as calculating a mathematical function. The processing block may also be partially programmable to perform a specific function such as calculating a mathematical function. The processing block may be part of an integrated circuit. Some existing processing blocks may not utilize their core arithmetic resources (e.g. adders and multipliers) efficiently. For example, existing DSP blocks may benefit from architectural modifications, such as improvements to their multiplier and routing logic, that would enhance their arithmetic capabilities at a relatively small cost in additional components.

SUMMARY

It would be advantageous for the architectural modifications to be backwards compatible so that existing hardware and software already designed and implemented to interact with such DSP blocks would not need to be changed. Thus, it would be desirable to develop a processing block with backwards compatible architecture for improving the arithmetic capability of existing processing blocks, such as a DSP block, for relatively low cost. To address the above and other shortcomings within the art, the present disclosure provides processing blocks with backwards compatible architecture for improving the arithmetic capability of existing processing blocks for relatively low cost. For example, by simply replacing the two complicated multipliers in the Arria V® DSP Block with three simpler 18 bit by 18 bit multipliers, adding several adders and other hardware stages, and adding a small amount of routing logic, it may be possible to enhance such a DSP block's arithmetic capability significantly, for example, by supporting larger real and complex number multiplications.

In one embodiment, a processing block is included on an integrated circuit device. The processing block includes a first, second, and third configurable multiplier and a configurable adder network. The processing block also includes a configurable interconnect within the processing block for routing signals from each of the multipliers to the adder network in accordance with a mode of operation.

In some embodiments, the configurable interconnect includes a first multiplexer stage configured to route signals from the input of the processing block to the input of each of the multipliers, and a second multiplexer stage configured to route signals from the output of each of the multipliers to the input of the adder network. In some embodiments, the configurable multipliers are each 18 bit by 18 bit multipliers. In some embodiments, the processing block is configured to perform a complex number multiplication using the first, second, and third configurable multipliers. In some embodiments, a real component of a result of the complex number multiplication is derived from the output of the first configurable multiplier and the output of the second configurable multiplier, and an imaginary component of the result of the complex number multiplication is derived from the output of the first configurable multiplier and the output of the third configurable multiplier. In some embodiments, the processing block is configured to implement the Karatsuba multiplication algorithm. A first portion of a result of the high precision number multiplication is derived from the output of the first configurable multiplier. A second portion of the result of the high precision number multiplication is derived from the output of the second configurable multiplier. A third portion of the result of the high precision number multiplication is derived from the output of the third configurable multiplier. In some embodiments, the processing block further includes a bit-shift operator stage. The configurable interconnect is configured to route signals from each of the multipliers to the bit-shift operator stage and to the adder network in accordance with the mode of operation. In some embodiments, the bit-shift operator stage comprises a right bit-shifter and a left bit-shifter. The configurable multipliers may be used in conjunction with one or more pre-adders and/or one ore more post-adders to compute various mathematical functions. The outputs of one or more pre-adders may be routed to the inputs of one or more of the configurable multipliers. The outputs of one or more of the configurable multipliers may be routed to the inputs of one or more post-adders. The pre-adders and/or post-adders may be required for certain modes of operation, such as for performing complex number multiplication or high precision number multiplication.

In an embodiment, an integrated circuit device includes a plurality of processing blocks. Each of the processing blocks includes a first, second, and third configurable 18 bit by 18 bit multiplier and a configurable adder network. Each of the processing blocks also includes a configurable interconnect within the processing block for routing signals from each of the multipliers to the adder network in accordance with a mode of operation.

In some embodiments, each of the processing blocks includes a bit-shift operator stage. In each of the processing blocks, the configurable interconnect of each processing block is configured to route signals from each of the multipliers to the bit-shift operator stage and to the adder network in accordance with the mode of operation. In some embodiments, the plurality of processing blocks includes a first, a second, and a third processing block. The integrated circuit device is configured to perform a 54 bit by 54 bit multiplication using the first, second, and third processing blocks. In some embodiments, the 54 bit by 54 bit multiplication includes a first 36 bit by 18 bit multiplication performed by the first processing block, an 18 bit by 18 bit multiplication performed by a configurable multiplier of the first processing block, an 18 bit right shift operation performed by a right bit-shifter of the first processing block, a second 36 bit by 18 bit multiplication performed by the second processing block, and a 36 bit by 36 bit multiplication performed by the third processing block using the Karatsuba algorithm. In some embodiments, the plurality of processing blocks includes a first, a second, a third, and a fourth processing block. The integrated circuit device is configured to perform a 72 bit by 72 bit multiplication using the first, second, third, and fourth processing blocks. In some embodiments, the 72 bit by 72 bit multiplication includes a first 36 bit by 36 bit multiplication performed by the first processing block, a second 36 bit by 36 bit multiplication performed by the second processing block, a third 36 bit by 36 bit multiplication performed by the third processing block, and a fourth 36 bit by 36 bit multiplication performed by the fourth processing block.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 4A shows an illustrative processing block configured to perform high precision number multiplication, in accordance with some embodiments of the present disclosure;

DETAILED DESCRIPTION

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

The figures described herein show illustrative embodiments, however the figures may not necessarily not show and may not be intended to show the exact layout of the hardware components contained in the embodiments. The figures are provided merely to illustrate the high level conceptual layouts of the embodiments. The embodiments disclosed herein may be implemented with any suitable number of components and any suitable layout of components in accordance with principles known in the art.

Although some of the figures may indicate specific number of bits used in some of the illustrative embodiments, those numbers of bits may be provided by way of example only. The embodiments disclosed herein may be implemented to accommodate any suitable number of bits.

Figure 1:
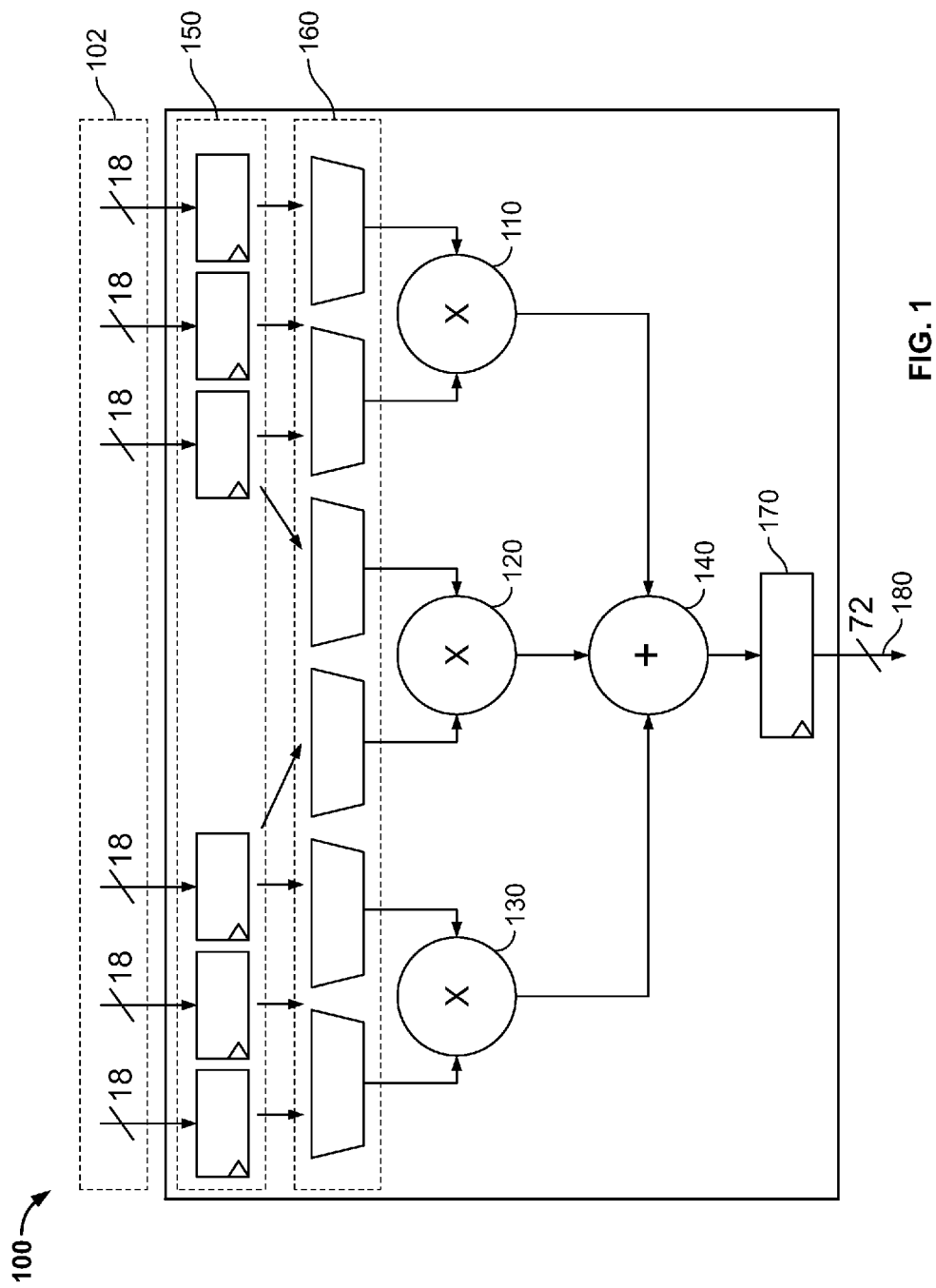
FIG. 1 shows an illustrative processing block in accordance with some embodiments of the present disclosure.

FIG. 1 shows an illustrative processing block in accordance with some embodiments of the present disclosure. Processing block 100 may be part of an integrated circuit device. Processing block 100 may include inputs 102, registers 150, configurable interconnect 160, configurable multipliers 110, 120, and 130, configurable adder network 140, register 170, and output 180. Processing block 100 provides the ability to perform complex, high precision, and double precision number arithmetic at relatively low cost.

Processing block 100 may perform various arithmetic operations on inputs 102 to produce output 180. Inputs 102 are input into registers 150, which in turn may send inputs 102 to interconnect 160. Interconnect 160 may route various signals, e.g. inputs 102 and/or values derived from inputs 102, to various components of processing block 100, such as, for example, the multipliers 110, 120, and 130. Multipliers 110, 120, and 130, and adder network 140 may perform various arithmetic operations to compute a mathematical function on inputs 102. For example, the mathematical function may be addition, subtraction, multiplication, or division on either real or complex numbers with varying bits of precision. The mathematical function may be associated with a mode of operation, e.g., complex number multiplication mode, high precision multiplication mode, or double precision multiplication mode. More detail regarding the operation of processing block 100 in these modes is provided further below.

Processing block 100 may be configured to operate in a particular mode via control signals input into interconnect 160. For a particular mode, these control signals may provide specific signal routing instructions to interconnect 160 so that processing block 100 may compute a specific mathematical function in accordance with the mode.

Inputs 102 may contain 108 bits. Inputs 102 may be conceptually separated into six groups, each group containing 18 bits of input as shown in FIG. 1. Thus, inputs 102 may represent a single number or various combinations of numbers. For example, inputs 102 may represent a single 108 bit number by using all 108 bits of input used to represent the 108 bit number. Inputs 102 may be used to represent two separate 54 bit numbers by using 54 bits of input to represent the first 54 bit number and another 54 bits of input to represent the second 54 bit number. Inputs 102 may also be used to represent two separate 36 bit numbers by using 36 bits of input to represent the first 36 bit number and another 36 bits of input to represent the second 36 bit number and leaving 36 bits of input unused. Inputs 102 may also be used to represent a complex number with a 36 bit real component and a 36 bit complex component by representing the real component using 36 bits of inputs 102 and the complex component using another 36 bits of inputs 102.

Processing block 100 may also include one or more pre-adder stages (not shown) whose outputs may be routed to the input of each of the multipliers 110, 120, and 130 by interconnect 160. Each pre-adder stage may include one or more adders that may be used to perform addition and/or subtraction. For example, each of the pre-adder stages may be used to compute one or more intermediate values derived from inputs 102 for later processing by the multipliers 110, 120, and/or 130. The pre-adder stages may be required for certain modes of operation, such as for performing complex number multiplication or high precision number multiplication. More details are provided below.

Interconnect 160 may route various signals, e.g. inputs 102 and/or values derived from inputs 102, to various components of processing block 100, such as multipliers 110, 120, and 130. Interconnect 160 may include multiple stages, i.e. groups, of multiplexers ("muxes") for routing the signals. For example, interconnect 160 may include two mux stages. The first mux stage may include a group of muxes configured via control signals (not shown) input into interconnect 160 to route signals from inputs 102 to the input of each of the multipliers 110, 120, and 130. Similarly, the second mux stage may include a group of muxes configured via control signals (not shown) input into interconnect 160 to route signals from the output of each of the multipliers 110, 120, and 130 to the input of adder stage 140. As mentioned above, the control signals may be associated with different modes of operation for processing block 100 so that processing block 100 may be configured to compute a number of different mathematical functions. For example, a mode of operation may be complex number multiplication mode, high precision number multiplication mode, or double precision number multiplication mode.

Multipliers 110, 120, and 130 may be configurable multipliers that accept inputs of any suitable bit size. For example, multipliers 110, 120, and 130 may be 18 bit by 18 bit multipliers.

Adder network 140 may be a configurable adder network that includes one or more adders. The adders may be individual adders or a combination of different carry save (redundant form) and carry propagate adders. Adder network 140 may include separate groups of adders, each allowing for a different addition and/or subtraction operation. The multiple addition and/or subtraction operations may occur at the same time, e.g. during the same clock cycle.

Register 170 may store the value of the output 180 of the mathematical function until the value of the output 180 is needed, for example, by a user or by some other hardware.

Processing block 100 may also operate in combination with other processing blocks to perform various mathematical functions.

Figure 2:
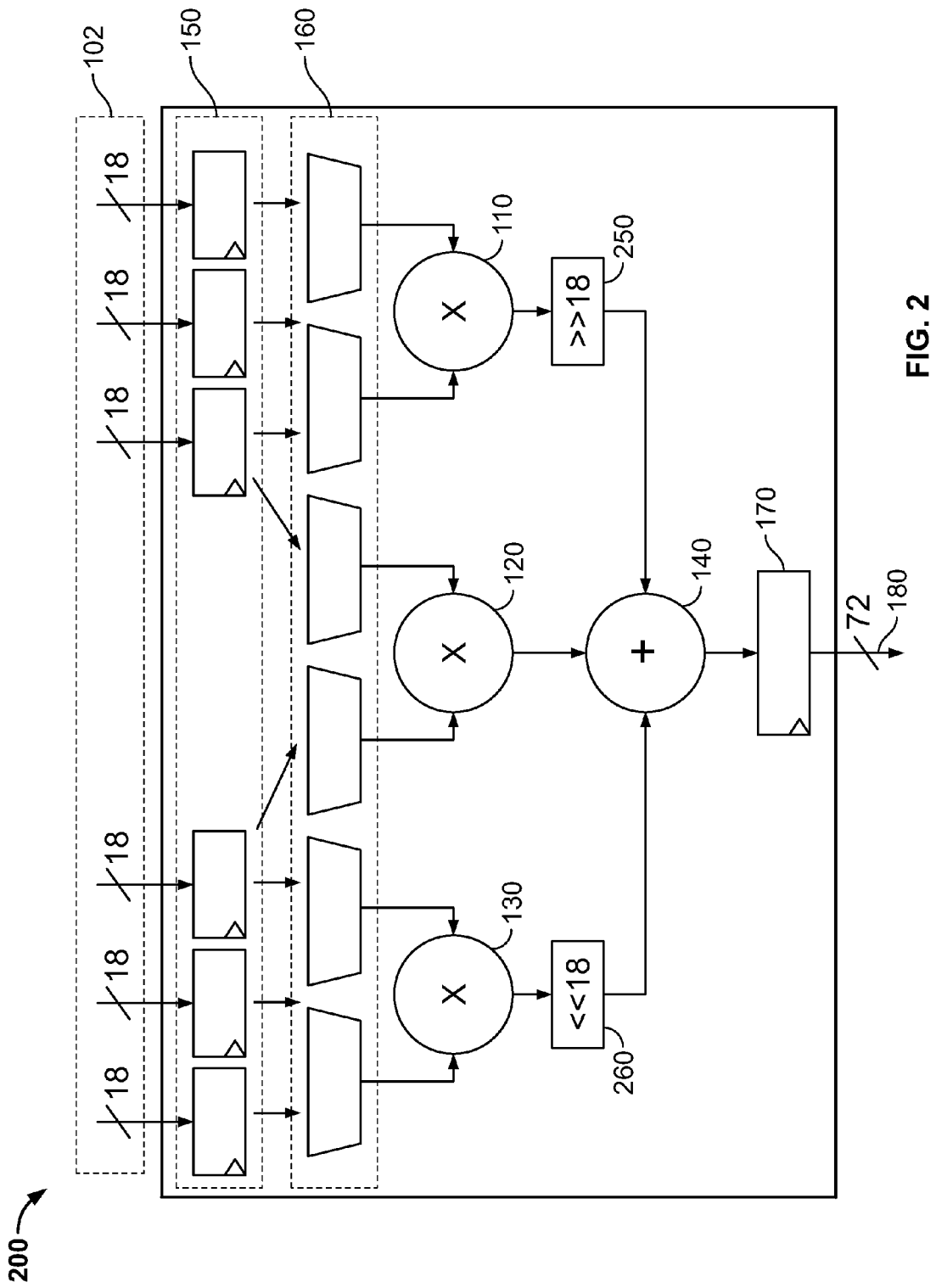
FIG. 2 shows an illustrative processing block with additional bit-shift logic, in accordance with some embodiments of the present disclosure.

FIG. 2 shows an illustrative processing block with additional bit-shift logic, in accordance with some embodiments of the present disclosure. Processing block 200 may be similar in form and function to processing block 100 of FIG. 1. In addition to the components contained in processing block 100, processing block 200 may also include a bit-shift operator stage that includes a left bit-shifter 260 and a right bit-shifter 250. Left bit-shifter 260 and right bit-shifter 250 may receive input from any of multipliers 130, 120, or 110 and may output data to adder network 140. Left bit-shifter 260 may shift a binary number input by some number of bits to the left. For example, left bit-shifter 260 may shift a binary number input up to 18 bits to the left. Similarly, right bit-shifter 250 may shift a binary number input by some number of bits to the right. For example, the right bit-shifter 260 may shift a binary number input up to 18 bits to the right.

Interconnect 160 may route various signals from the output of each of the multipliers 110, 120, and 130 to the input of the left bit-shifter 260, to the input of the right bit-shifter 250, and to the input of adder stage 140.

Figure 5:
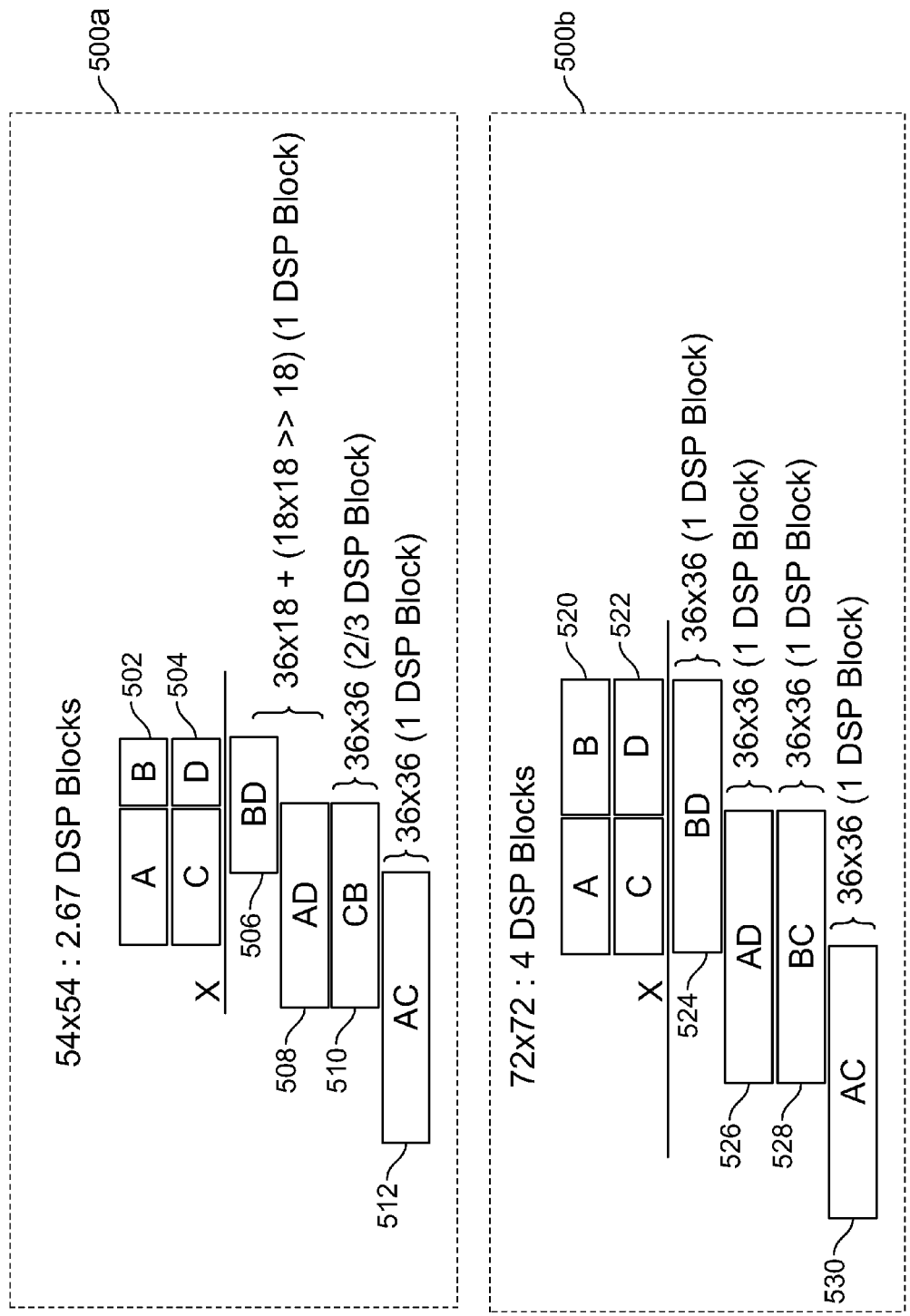
FIG. 5 shows an illustrative diagram of double precision number multiplication performed by a combination of processing blocks, in accordance with some embodiments of the present disclosure.

Left bit-shifter 260 and right bit-shifter 250 may be used by processing block 200 or a combination of processing blocks to compute a mathematical function. For example, as shown in FIG. 5, a large multiplication may require the computation of smaller, intermediate multiplications. The numerical results of the intermediate multiplications may need to be appropriately bit-shifted before being added together to produce the final numerical result of the large multiplication. FIG. 5 is described in greater detail, below.

Left bit-shifter 260 and right bit-shifter 250 are shown in processing block 200 as being, by way of example, 18-bit bit shifters. Left bit-shifter 260 and right bit-shifter 250 may be configured to shift a binary number input by higher or lower numbers of bits. Furthermore, although not shown, processing block 200 may include multiple left bit-shifters and right bit-shifters.

Figure 3:
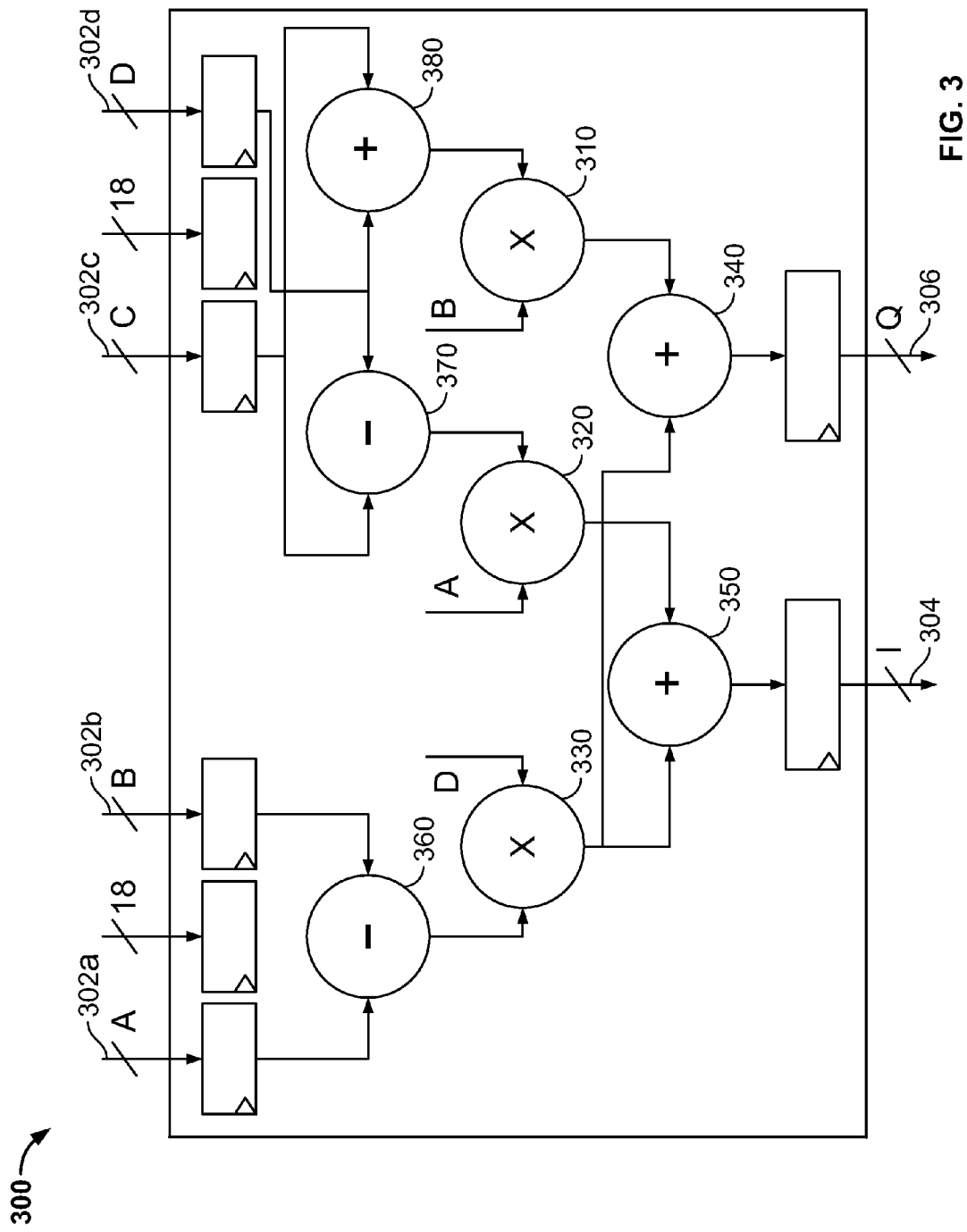
FIG. 3 shows an illustrative processing block configured to perform complex number multiplication, in accordance with some embodiments of the present disclosure.

FIG. 3 shows an illustrative processing block configured to perform complex number multiplication, in accordance with some embodiments of the present disclosure. Processing block 300 may correspond to a particular configuration of processing block 200 of FIG. 2 and/or processing block 100 of FIG. 1. The complex number multiplication algorithm described herein is known as canonic complex multiplication.

The use of other complex number multiplication algorithms with processing block 300 may be possible.

Processing block 300 includes inputs 302a, 302b, 302c, and 302d (collectively referred to as inputs 302). Processing block 300 also includes adders 340, 350, 360, 370, and 380, multipliers 310, 320, and 330, and outputs 304 and 306. Inputs 302 may be similar in form and in function to inputs 102 of processing block 100. Similarly, multipliers 310, 320, and 330 may be similar in form and in function to multipliers 110, 120, and 130, respectively, of processing block 100. Adders 350 and 360 may be similar in form and in function to adders within adder network 140 of processing block 100. Outputs 304 and 306 may be similar in form and function to portions of output 180 of processing block 100. Adders 360, 370, and 380 may be similar in form and function to one or more of the pre-adder stages in processing block 100 (not shown in FIG. 1).

Processing block 300 may be used to multiply two complex numbers X and Y where, for example $$X=A+j*B$$

$$Y=C+j*D.$$

In this example, j indicates the imaginary number sqrt(−1), where sqrt is the square root operation. Thus, the value A represents the real number component of X, and the value B represents the imaginary number component of X. Similarly, the value C represents the real number component of Y, and the value D represents the imaginary number component of Y. The result of the complex multiplication is $$X*Y=(A+j*B)*(C+j*D)$$

$$X*Y=(A*C-B*D)+j*(A*D+B*C).$$

Thus, to compute the product X*Y, there are two terms that must be computed: (1) the term A*C−B*D, and (2) the term A*D+B*C.

As shown in FIG. 3, processing block 300 may be used to compute the product of the complex product resulting from the multiplication of X and Y. Inputs 302a and 302b may be input into adder 360. Inputs 302c and 302d may be input into each of adder 370 and adder 380. The output of adder 360 and input 302d may be input into multiplier 330. Input 302a and the output of adder 370 may be input into multiplier 320. Input 302b and the output of adder 380 may be input into multiplier 310. The output of multiplier 330 and the output of multiplier 320 may be input into adder 350. The output of multiplier 330 and the output of multiplier 310 may be input into adder 340. The output of adder 350 may be output into output 304. The output of adder 340 may be output into output 306.

As shown, in operation, the values A and B may be input into input 302a and input 302b, respectively. Similarly, the values C and D may be input into input 302c and input 302d, respectively. As shown in FIG. 3, the value of input 302a (A) and the value of input 302b (B) are input into adder 360. The output of adder 360 is the value A−B, which is input along with input 302d (D) into multiplier 330. Thus, the output of multiplier 330 is the value D*(A−B). Similarly, the value of input 302c (C) and the value of input 302d (D) are input into adder 370. The output of adder 370 is the value C−D, which is input along with input 302a (A) into multiplier 320. Thus, the output of multiplier 320 is the value A*(C−D). Also similarly, because the value of input 302c (C) and the value of input 302d (D) are input into adder 380, the output of adder 380 is the value C+D, which is input along with the value of input 302b (B) into multiplier 310. Thus, the output of multiplier 310 is the value B*(C+D).

As mentioned above, adder 350 may add the output of multiplier 320 and the output of multiplier 330. Therefore, continuing with the above example, the value of the output of adder 350 may be A*C−B*D, and accordingly the value of output 304 may be A*C−B*D. Similarly, adder 340 may add the output of multiplier 320 and the output of multiplier 310. Therefore, the value of the output of adder 340 may be A*D+B*C, and accordingly the value of output 306 may be A*D+B*C. If the value I is used to represent the value of output 304, and the value Q is used to represent the value of output 306, then for this example $$I=A*C-B*D$$

$$Q=A*D+B*C$$

If I and Q are substituted into the calculations performed previously, then the product X*Y=I+j*Q because X*Y=(A*C−B*D)+j*(A*D+B*C). Thus, the value I is the real component of the product X*Y, and the value Q is the imaginary component of the product X*Y. Therefore, as shown in FIG. 3, and from the above example calculations, processing block 300 may be configured to perform complex number multiplication.

FIG. 4A shows an illustrative processing block configured to perform high precision number multiplication, in accordance with some embodiments of the present disclosure. Processing block 400 may be similar in form and function to a particular configuration of processing block 200 of FIG. 2 and/or a particular configuration of processing block 100 of FIG. 1.

Processing block 400 includes inputs 402a, 402b, 402c and 402d (collectively referred to as inputs 402); output 404; multipliers 410, 420, and 430; and adders 440, 450, 460, 470, and 480. Inputs 402 may be similar in form and function to inputs 102 of processing block 100. Similarly, multipliers 410, 420, and 430 may be similar in form and function to multipliers 110, 120, and 130 respectively of processing block 100. Adders 440, 450, and 460 may be similar in form and function to portions of adder network 140 of processing block 100. Output 404 may be similar in form and function to output 180 of processing block 100. Adders 470 and 480 may be similar in form and function to one or more of the pre-adder stages of processing block 100 (not shown in FIG. 1). Processing block 400 may also include left and right bit-shifters (not shown) that are similar in form and function to left bit-shifter 260 and right bit-shifter 250 of FIG. 2. As mentioned previously, adders 440, 450, 460, 470, and 480 may be individual adders or a combination of different carry save (redundant form) and carry propagate adders.

Processing block 400 may be used to perform high precision number multiplication (e.g. 36 bit by 36 bit number multiplication). Processing block 400 may be configured to utilize the Karatsuba multiplication algorithm. Processing block 400 may multiply two large numbers M and N where, for example $$M=A*(2^{18})+B$$

$$N=C*(2^{18})+D$$

In this example, the numbers M and N may each be decomposed into two values. Thus, the number M may be represented using the values A and B as shown above, and the number N may be represented using the values C and D. Decomposing the numbers M and N may allow for faster and more efficient multiplication of the numbers using the Karatsuba algorithm. The product M*N can be expressed by the equations $$M*N=(A*(2^{18})+B)*(C*(2^{18})+D)$$

$$M*N=A*C*(2^{36})+[A*D+B*C]*(2^{18})+B*D$$

Thus, computing the product M*N may require the computation of three terms: (1) the term A*C, (2) the term A*D+B*C, and (3) the term B*D. In addition, the product M*N may make use of bit shifting operations.

As shown in FIG. 4A, processing block 400 may be used to compute the product M*N. Inputs 402a and 402b may be input into adder 470. Inputs 402c and 402d may be input into adder 480. Inputs 402a and 402c may be input into multiplier 430. Inputs 402b and 402d may be input into multiplier 410. The output of adder 470 and the output of adder 480 may be input into multiplier 120. The output of multiplier 430 and the output of multiplier 410 may be input into adder 460. The output of multiplier 420 and the output of adder 460 may be input into the adder 450. The output of multiplier 430, the output of adder 450, and the output of multiplier 410 may be input into adder 440. The output of adder 440 may become output 404.

As shown, in operation, the values A and B may be input into input 402a and input 402b, respectively. Similarly, the values C and D may be input into input 402c and input 402d, respectively. The value of input 402a (A) and the value of input 402b (B) are input into multiplier 430. The value of input 402c (C) and the value of input 402d (D) are input into multiplier 410. Accordingly, the value of the output of multiplier 430 is the product A*C, and the value of the output of multiplier 410 is the product B*D. Thus, the outputs of multipliers 430 and 410 may provide the first and third terms of the product M*N, respectively.

The computation of the second term of the product M*N may require additional operations that make use of multiplier 420 and adders 450 and 460. The value of input 402a (A) and the value of input 402b (B) are input into adder 470, and the value of input 402c (C) and the value of input 402d (D) are input into adder 480, so the output of adder 470 is the value A+B, and the output of adder 480 is the value C+D. The output of adder 470 and the output of adder 480 are input into multiplier 420, so the output of the multiplier 420 is the value (A+B)*(C+D). The output of multiplier 430 and the output of multiplier 410 are input into adder 460, so the output of adder 460 is the value A*C+B*D. The output of multiplier 420 and the output of adder 460 are input into adder 450. Accordingly, the value of the output of adder 450 is given by the expression $$(A+B)*(C+D)-(A*C+B*D)=A*D+B*C$$

Thus, the output of adder 450 may provide the third term of the product M*N.

The values A*C and A*D+B*C may be appropriately bit-shifted prior to being input into adder 440. For example, a left bit-shifter (not shown) may be used to shift the value A*C by 36 bits to the left to obtain the term AC*(2^36). Similarly, the left bit-shifter (not shown) may also be used to shift the value A*D+B*C by 18 bits to the left to obtain the term [A*D+B*C]*(2^18). The left bit-shifter may be similar to left bit-shifter 260 of FIG. 2. The value BD does not require any bit-shifting. Adder 440 may add the value A*C*(2^36), the value [A*D+B*C]*(2^18), and the value B*D (together to obtain the expression $$A*C(2^{36})+[A*D+B*C](2^{18})+B*D$$

Thus, because the output of adder 440 produces the result for the product M*N, output 404 may provide the value for the product M*N.

Processing block 400 may also include a 4:2 compressor (not shown) separately or as a part of adder 440. The 4:2 compressor may reduce the number of bits in output 404. For example, if processing block 400 performs a 36 bit by 36 bit multiplication, output 404 may contain 70 bits.

Figure 4B:
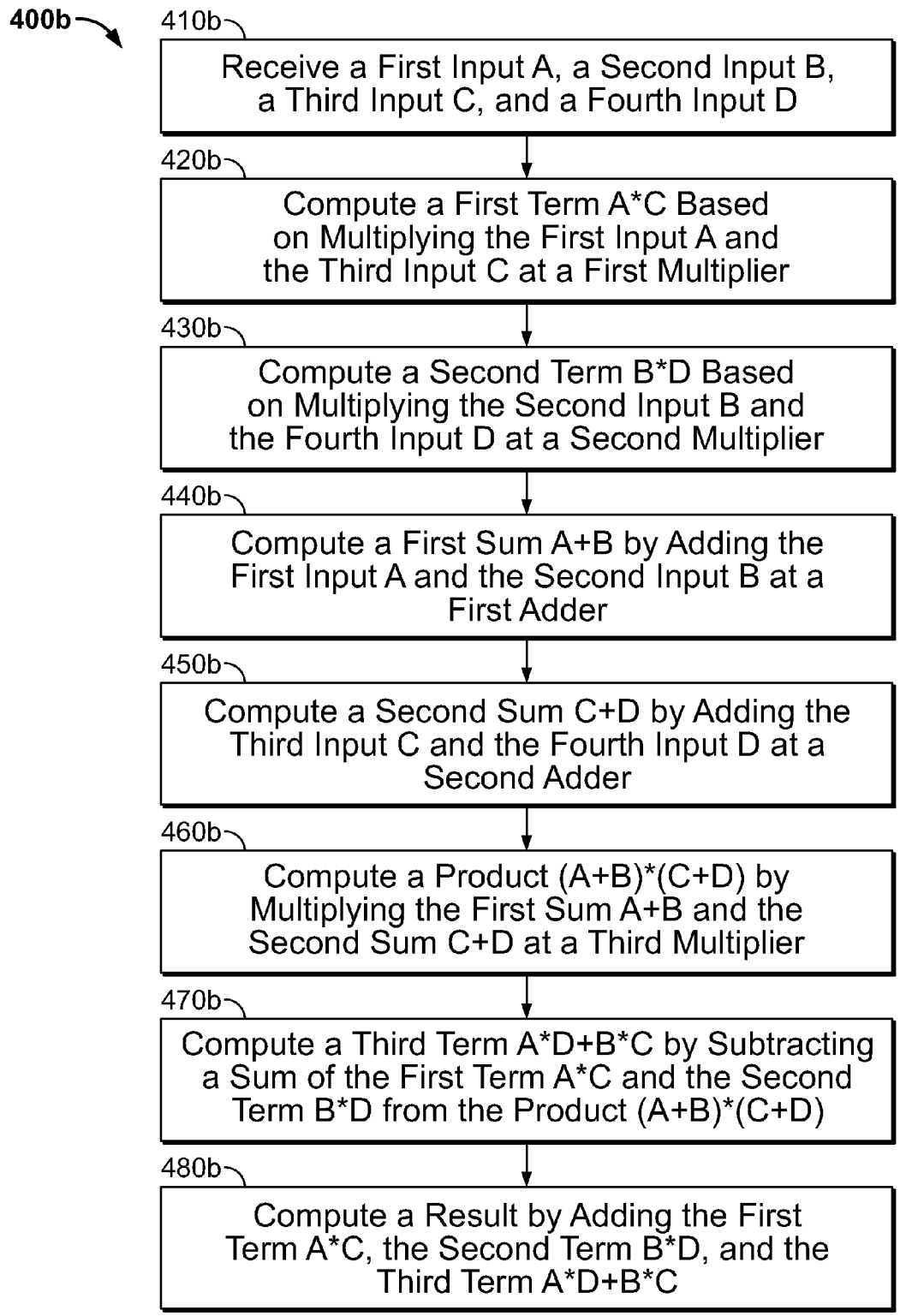
FIG. 4B shows an illustrative flow diagram of a process for performing high precision number multiplication, in accordance with some embodiments of the present disclosure.

FIG. 4B shows an illustrative flow diagram of a process for performing high precision number multiplication, in accordance with some embodiments of the present disclosure. In particular, FIG. 4B illustrates the operation of processing block 400 for performing a high precision number multiplication using the Karatsuba algorithm as described above. A process 400b begins at 410b by receiving a first, a second, a third, and a fourth input. The first, second, third, and fourth inputs may correspond to the input values A, B, C, and D respectively, as described above.

At 420b, a first term A*C is computed based on multiplying the first input A and the third input C at a first multiplier, such as multiplier 430.

At 430b, a second term B*D is computed based on multiplying the second input B and the fourth input D at a second multiplier, such as multiplier 410.

At 440b, a first sum A+B is computed by adding the first input A and the second input B at a first adder, such as adder 470.

At 450b, a second sum C+D is computed by adding the third input C and the fourth input D at a second adder, such as adder 480.

At 460b, a product (A+B)*(C+D) is computed by multiplying the first sum A+B and the second sum C+D at a third multiplier, such as multiplier 420.

At 470b, a third term A*D+B*C is computed by subtracting a sum of the first term A*C and the second term B*D from the product (A+B)*(C+D).

At 480b, a result is computed by adding the first term A*C, the second term A*D, and the third term A*D+B*C. The terms A*C and A*D+B*C may be appropriately bit-shifted prior to being added, as described above.

FIG. 4A illustrates a 36 bit by 36 bit multiplication performed using processing block 400 as an example only. Processing block 400 may multiply smaller numbers such as a 36 bit number by an 18 bit number, or a 27 bit number by a 27 bit number by using fewer input bits to represent the smaller numbers. In addition, processing block 400 may be adapted to multiply numbers containing more than 36 bits, for example, by increasing the number of input bits and by using additional multiplier logic. The sizes of the shifters and adders in processing block 400 may also be different if the processing block 400 is adapted to multiply numbers of different sizes.

The complex and high precision number multiplications described for FIGS. 3 and 4A may be implemented on the same processing block. For example, as described previously, interconnect 160 of FIG. 1 may be used to dynamically multiplex the connections between the adders and the multipliers of FIG. 3 and FIG. 4A in different arrangements as required. This multiplexing can be performed each time the FPGA is configured on power up or reset. As described previously, the multiplexing may also be controlled by control signals that may change from one clock cycle to the next. Although FIGS. 1-4A show processing blocks that are combinatorial internally, one or more additional pipeline stages may be inserted in the datapath inside a processing block. Alternatively, a processing block could be completely combinatorial, with no registers on the input and output. Registers, if required, could be supported by registers in the soft logic fabric surrounding the processing block.

Although FIGS. 1-4A show processing blocks with particular combinations of multipliers and adders, it is possible to combine multipliers and adders in any order to perform the mathematical operations described previously.

FIG. 5 shows an illustrative diagram of double precision number multiplication performed by a combination of processing blocks, in accordance with some embodiments of the present disclosure. The processing blocks may be similar in form and/or function to processing block 100 of FIG. 1 and/or processing block 200 of FIG. 2.

Double precision number multiplication may be used for multiplication of numbers that are larger than the numbers that are multiplied in high precisions multiplication. For example, double precision number multiplication may include 54 bit by 54 bit number multiplication and/or 72 bit by 72 bit number multiplication. The multiplication of such numbers may require one or more processing blocks. 54 bit by 54 bit and 72 bit by 72 bit double precision multiplication may be useful for various applications. For example, IEEE 754 floating point double precision format uses a 53 bit significand, including the implied leading one bit. Therefore, a signed 54 bit by 54 bit double precision multiplier may be used to perform a 53 bit by 53 bit unsigned multiplication of two IEEE 754 floating point numbers. Similarly, a 72 bit by 72 bit double precision multiplier may be used to perform accurate calculation of various functions, such as trigonometric functions.

For example, at 500a, a multiplication of a 54 bit number P by a 54 bit number Q may be performed by three processing blocks. Each of the processing blocks may be processing block 100 of FIG. 1 or processing block 200 of FIG. 2. As shown in FIG. 5, at 502, P may be decomposed into a 36 bit number A and an 18 bit number B where P=A*(2^18)+B. Similarly, at 504, Q may be decomposed into a 36 bit number C and an 18 bit number D where Q=C*(2^18)+D.

As shown in FIG. 5, at 500a, four intermediate products (e.g., B*D, A*D, C*B, and A*C) may be computed and added together to obtain the final product P*Q. At 506, the first of three processing blocks may be used to obtain the intermediate product BD using one of processing block's multipliers to perform an 18 bit by 18 bit number multiplication. For example, the 18 bit by 18 bit number multiplication may be performed by a multiplier similar in form and function to multiplier 130 of FIG. 1. Similarly, at 508 the first processing block may be used to obtain the intermediate product AD using the processing block's other two multipliers to perform a 36 bit by 18 bit number multiplication. For example, the 36 bit by 18 bit number multiplication may be performed by two multipliers similar in form and function to multiplier 120 and multiplier 110 of FIG. 1. The first processing block may also use a right bit-shifter within the first processing block to bit-shift the intermediate product B*D by 18 bits to the right. The result may be added to the intermediate product A*D. For example, the right bit-shifter may be similar in form and function to right bit-shifter 250 in FIG. 2.

At 510, the second of the three processing blocks may be used to obtain the intermediate product C*B using two of the processing block's multipliers to perform a 36 bit by 18 bit number multiplication. The remaining third multiplier in the processing block may not be required and may be used to perform some other, possibly unrelated, operation. Thus, ⅔ of the second processing block may be needed.

At 512, the third of the three processing blocks may be used to obtain the intermediate product A*C via a 36 bit by 36 bit number multiplication. For example, A*C may be computed using the configuration of processing block 400 in FIG. 4A, as described above.

All four intermediate products B*D, A*D, C*B, and A*C may be appropriately bit-shifted using one or more bit-shifters inside one or more of the first, second, and/or third processing blocks. Then, the intermediate products B*D, A*D, and C*B may be added together to compute the final product of the 54 bit by 54 bit multiplication of P and Q.

As another example, at 500b, four processing blocks may be used to multiply two 72 bit numbers W and Z. As shown in FIG. 5, at 520, W may be decomposed into two 36 bit numbers A and B where $W=A*(2^{36})+B$. Similarly, at 522, Z may be decomposed into two 36 bit numbers C and D where $Z=C*(2^{36})+D$. As shown in FIG. 5, at 500b, four intermediate products (e.g., B*D, A*D, C*B, and A*C) may be computed and added together to obtain the final product of the multiplication of W and Z.

Each of the four processing blocks may be used to compute one of the four intermediate products via a 36 bit by 36 bit number multiplication. For example, each processing block may use the configuration of processing block 400 of FIG. 4A, as described above. At 524, the intermediate product B*D is computed. At 526, the intermediate product A*D is computed. At 528, the intermediate product B*C is computed. At 530, the intermediate product A*C is computed. The four intermediate products B*D, A*D, C*B, and A*C may be appropriately bit-shifted using one or more bit-shifters inside one or more of the four processing blocks. The intermediate products B*D, A*D, C*B, and A*C may added together using the four processing blocks to compute the final product of the 72 bit by 72 bit multiplication of W and Z.

FIG. 5 illustrates how multiple processing blocks may be combined to perform 54 bit by 54 number bit multiplications (at 500a) and 72 bit by 72 bit number multiplications (at 500b) by way of example only. Multiple processing blocks may be combined appropriately to perform multiplications on numbers containing other numbers of bits. For example, multiple processing blocks may use external routing logic to combine and add the partial products computed by individual processing blocks. Direct interblock connections (not shown) may also be provided to facilitate partial product addition using compressors (i.e. carry save, redundant form) and adders in the processing blocks. Although outputs of 54 bits or 72 bits are shown, these are merely illustrative. The output size may be larger than the sum of the inputs of any processing block, especially if multiple processing blocks are added together using direct interblock connections.

Figure 6:
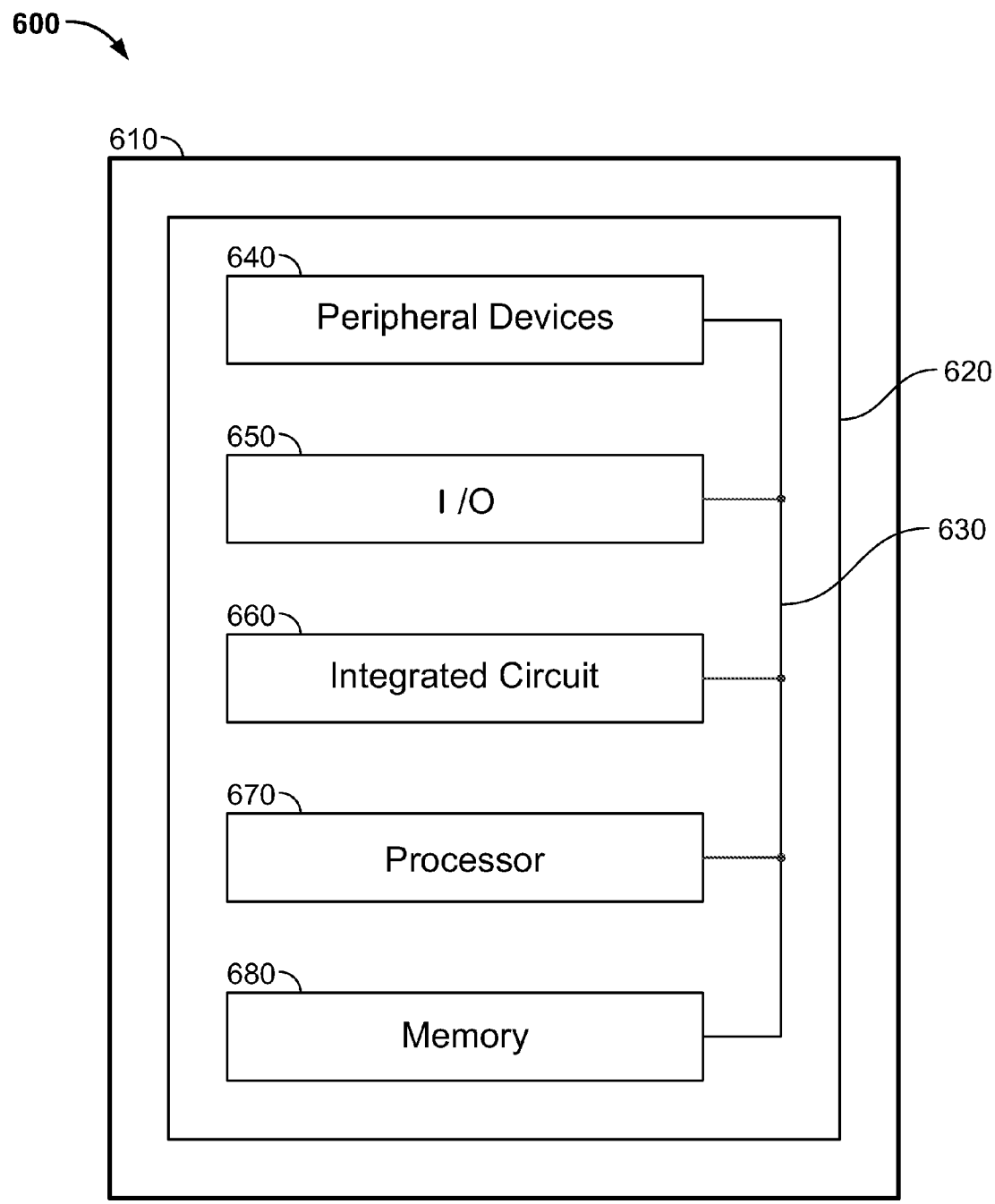
FIG. 6 shows an illustrative system that may be used to implement some embodiments of the present disclosure.

FIG. 6 shows an illustrative system that may be used to implement some embodiments of the present disclosure. System 600 may be or may include a circuit or other device (e.g., processing block, integrated circuit, application specific standard product (ASSP), application specific integrated circuit (ASIC), programmable logic device (PLD), full-custom chip, dedicated chip). System 600 can include one or more of the following components: a processor 670, memory 680, I/O circuitry 650, a circuit 660, and peripheral devices 640. Circuit 660 may contain one or more processing blocks similar in form and function to processing block 100, processing block 200, processing block 300, and/or processing block 400. These components are connected together by a system bus or other interconnections 630 and are populated on a circuit board 620 which is contained in an end-user system 610.

System 600 may be used in a wide variety of applications, such as computer networking, data networking, instrumentation, video processing, digital signal processing, or any other application where the advantage of using programmable or reprogrammable logic is desirable. Circuit 660 may be used to perform a variety of different logic functions and/or calculate a variety of different mathematical functions. For example, circuit 660 may be configured as a controller or group of processing blocks that work in cooperation with processor 670. Circuit 660 may also be used to perform signal processing. In yet another example, circuit 660 may be configured as an interface between processor 670 and one of the other components in system 600. It should be noted that system 600 is only exemplary, and that the true scope and spirit of the embodiments should be indicated by the following claims.

The foregoing is merely illustrative of the principles of the embodiments and various modifications can be made by those skilled in the art without departing from the scope and spirit of the embodiments disclosed herein. The above described embodiments of the present disclosure are presented for purposes of illustration and not of limitation, and the present invention is limited only by the claims which follow.

What is claimed is:

1. A processing block on an integrated circuit device, the processing block comprising:
    a first configurable multiplier, a second configurable multiplier, and a third configurable multiplier, wherein the processing block is configured to perform a high precision number multiplication using the first, the second, and the third configurable multipliers;
    a configurable adder network comprising a plurality of pre-adders and a plurality of post-adders, wherein connections between the plurality of pre-adders and the first, second, and third configurable multipliers and connections between the first, second, and third configurable multipliers and the plurality of post-adders are configured based on a selected mode of operation corresponding to high precision number multiplication, in which:
        the plurality of post-adders includes at least a first adder, a second adder, and a subtractor;
        the first adder outputs a sum of outputs of the first and third configurable multipliers;
        the subtractor outputs a difference between an output of the second configurable multiplier and an output of the first adder; and
        the second adder outputs a sum of the outputs of the first configurable multiplier, the third configurable multiplier, and the subtractor; and
    a configurable interconnect for selectively routing signals between the multipliers and the configurable adder network in accordance with the mode of operation.

2. The processing block of claim 1, wherein the configurable interconnect comprises:
    a first multiplexer stage configured to selectively route signals from an input of the processing block to an input of each of the multipliers; and
    a second multiplexer stage configured to selectively route signals from an output of each of the multipliers to an input of the adder network.

3. The processing block of claim 2, wherein:
    the pre-adders form a pre-adder network with pre-adder inputs and pre-adder outputs that are set by the first multiplexer stage; and
    the post-adders form a post-adder network with post-adder inputs and post-adder outputs that are set by the second multiplexer stage; and
    the connections are set based on the mode of operation, which is selected from a set of modes comprising a complex multiplication mode and a high precision number multiplication mode.

4. The processing block of claim 1, wherein the configurable multipliers are each 18 bit by 18 bit multipliers.

5. The processing block of claim 1, wherein the processing block is configured to perform a 36 bit by 36 bit multiplication to obtain a 70 bit output.

6. The processing block of claim 1, wherein the high precision number multiplication is implemented using a Karatsuba multiplication algorithm, wherein:
- a first portion of a result of the high precision number multiplication is derived from an output of the first configurable multiplier;
- a second portion of the result of the high precision number multiplication is derived from an output of the second configurable multiplier; and
- a third portion of the result of the high precision number multiplication is derived from an output of the third configurable multiplier.

7. The processing block of claim 1 further comprising a bit-shift operator stage, wherein the configurable interconnect is configured to route signals from each of the multipliers to the bit-shift operator stage and to the adder network in accordance with the mode of operation.

8. The processing block of claim 7, wherein the bit-shift operator stage comprises a right bit-shifter and a left bit-shifter.

9. The processing block of claim 8, wherein the right bit-shifter is an 18 bit right bit-shifter, and the left bit-shifter is an 18 bit left bit-shifter.

10. The processing block of claim 1, wherein the processing block comprises no more than three pre-adders and three post-adders and no more configurable multipliers than the first, second, and third configurable multipliers, and wherein the first, second, and third configurable multipliers are configured to operate independently from one another.

11. An integrated circuit device comprising:
- a plurality of processing blocks, each processing block comprising:
- a first configurable multiplier, a second configurable multiplier, and a third configurable multiplier;
- a configurable adder network comprising a plurality of pre-adders and a plurality of post-adders, wherein connections between the plurality of pre-adders and the first, second, and third configurable multipliers and connections between the first, second, and third configurable multipliers and the plurality of post-adders are configured based on a selected mode of operation corresponding to high precision number multiplication, in which:
  - the plurality of post-adders includes at least a first adder, a second adder, and a subtractor;
  - the first adder outputs a sum of outputs of the first and third configurable multipliers;
  - the subtractor outputs a difference between an output of the second configurable multiplier and an output of the first adder; and
  - the second adder outputs a sum of the outputs of the first configurable multiplier, the third configurable multiplier, and the subtractor; and
- a configurable interconnect within the processing block for selectively routing signals between the multipliers and the configurable adder network in accordance with the mode of operation.

12. The integrated circuit device of claim 11, wherein the configurable interconnect of at least one processing block in the plurality of processing blocks comprises:
- a first multiplexer stage configured to selectively route signals from an input of the at least one processing block to an input of each of the multipliers of the at least one processing block; and
- a second multiplexer stage configured to selectively route signals from an output of each of the multipliers of the at least one processing block to an input of the adder network of the at least one processing block.

13. The integrated circuit device of claim 11, wherein the configurable multipliers of at least one processing block are each 18 bit by 18 bit multipliers.

14. The integrated circuit device of claim 11, wherein the at least one of the processing blocks is configured to perform a 36 bit by 36 bit multiplication to obtain a 70 bit output.

15. The integrated circuit device of claim 11, wherein the high precision number multiplication is implemented using a Karatsuba multiplication algorithm, wherein:
- a first portion of a result of the high precision number multiplication is derived from an output of the first configurable multiplier of the at least one of the processing blocks;
- a second portion of the result of the high precision number multiplication is derived from an output of the second configurable multiplier of the at least one of the processing blocks; and
- a third portion of the result of the high precision number multiplication is derived from an output of the third configurable multiplier of the at least one of the processing blocks.

16. The integrated circuit device of claim 11, wherein at least one of the processing blocks further comprises a bit-shift operator stage, wherein the configurable interconnect of the at least one of the processing blocks is configured to route signals from each of the multipliers of the at least one of the processing blocks to the bit-shift operator stage and to the adder network of the at least one of the processing blocks in accordance with the mode of operation.

17. The integrated circuit device of claim 16, wherein the bit-shift operator stage comprises a right bit-shifter and a left bit-shifter.

18. The integrated circuit device of claim 17, wherein the right bit-shifter is an 18 bit right bit-shifter, and the left bit-shifter is an 18 bit left bit-shifter.

* * * * *